Dec. 23, 1941.       G. T. MARKEY       2,267,473
EGG CAGE, INCUBATING, AND HATCHING DEVICE
Filed Feb. 25, 1939       3 Sheets-Sheet 1
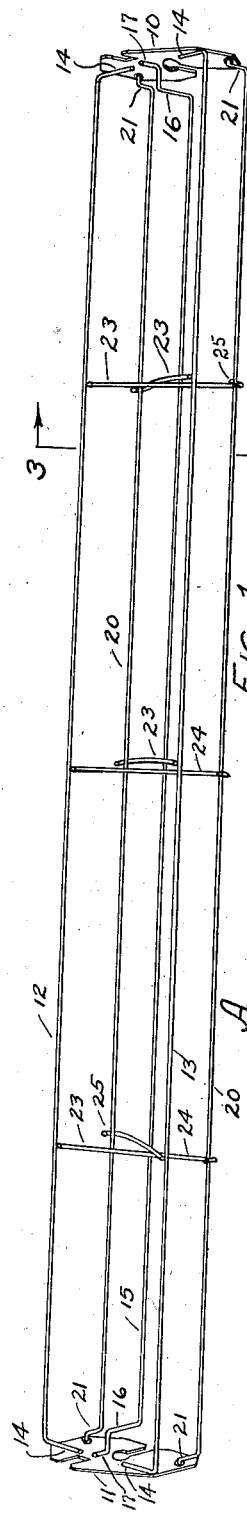
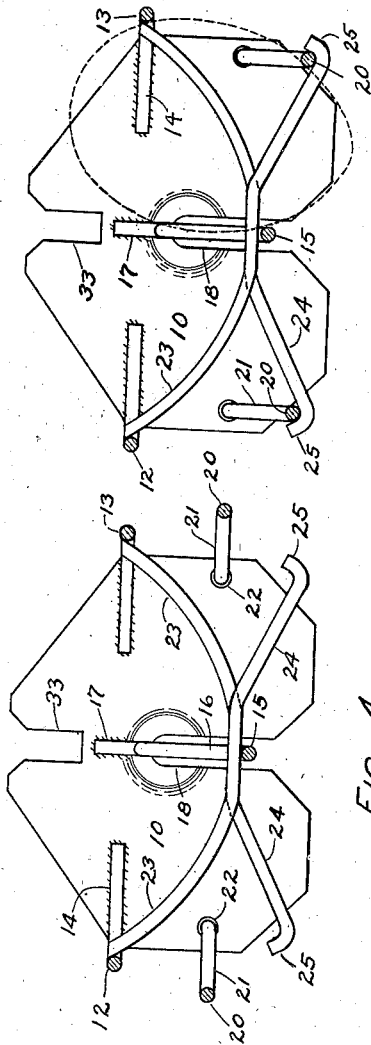
INVENTOR
GEORGE T. MARKEY
BY A.S.Krob
ATTORNEY Dec. 23, 1941.  G. T. MARKEY  2,267,473
EGG CAGE, INCUBATING, AND HATCHING DEVICE
Filed Feb. 25, 1939  3 Sheets-Sheet 2

INVENTOR
GEORGE T. MARKEY
BY A.S.Krob
ATTORNEY

Dec. 23, 1941.                G. T. MARKEY                2,267,473
               EGG CAGE, INCUBATING, AND HATCHING DEVICE
                     Filed Feb. 25, 1939          3 Sheets-Sheet 3
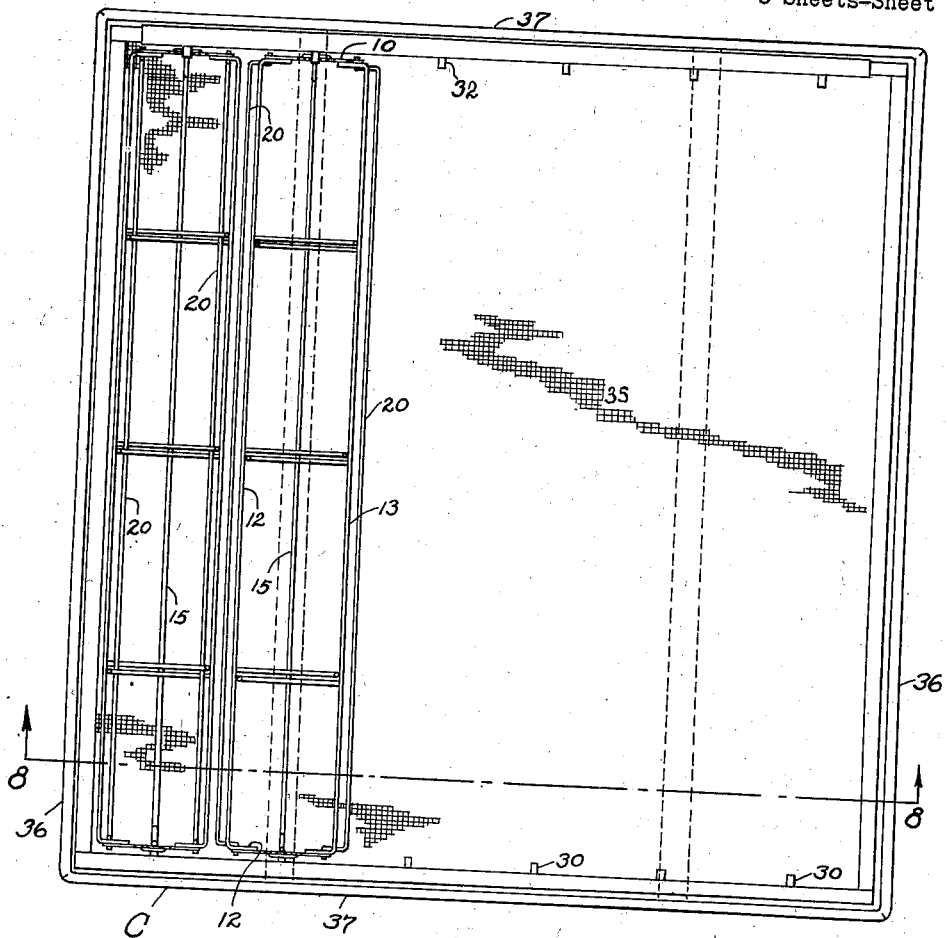
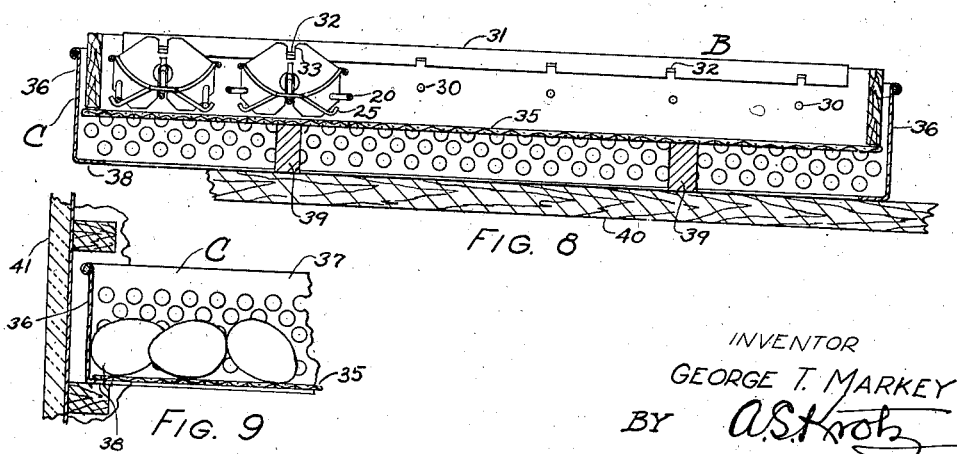
INVENTOR
GEORGE T. MARKEY
BY A. S. Kroh
ATTORNEY Patented Dec. 23, 1941

2,267,473

UNITED STATES PATENT OFFICE 2,267,473

EGG CAGE, INCUBATING, AND HATCHING DEVICE

George T. Markey, Fort Atkinson, Wis., assignor to James Manufacturing Company, Fort Atkinson, Wis., a company of Wisconsin Application February 25, 1939, Serial No. 258,353

3 Claims. (Cl. 119—43)

The present invention relates to improved means for incubating and hatching eggs and has for its objects placing the eggs in incubating trays and leaving them there for say 19 days or until they begin to pip and then placing the eggs in hatching trays.

Another object of the present invention is to provide novel means whereby the eggs may be moved from the cages of the incubating trays to the hatching trays without handling and in mass and without removing the cages from the trays.

A further object of the present invention is to provide means whereby the hatching trays may be positioned in a separate compartment in the cabinet or in a separate cabinet. In either event, the invention includes means whereby the eggs may be conveniently placed in the cages without removing the cages from the trays and whereby the eggs may be conveniently transferred from the incubating trays to the hatching trays without individually handling the eggs.

To these and other useful ends my invention consists of parts, combinations of parts, or their equivalents, and mode of operation, as hereinafter set forth and claimed and shown in the accompanying drawings in which:

Fig. 1 is a three quarters isometric side view of my improved egg cage, the swinging bars being in working position.

Fig. 2 is a view similar to Figure 1 except that the swinging bars are moved to the position required for releasing the eggs.

Fig. 3 is a transverse sectional view taken on line 3—3 of Figure 1.

Fig. 4 is a transverse sectional view taken on line 4—4 of Figure 2.

Fig. 7 is a top view illustrating the incubating tray in position in the hatching tray, the preferred position required for moving the eggs to the hatching tray.

Fig. 8 is a transverse sectional view taken on line 8—8 of Figure 7.

Fig. 9 is an enlarged fractional section of the hatching tray and the cabinet illustrating the screen bottom and the eggs in position for hatching.

Figure 5:
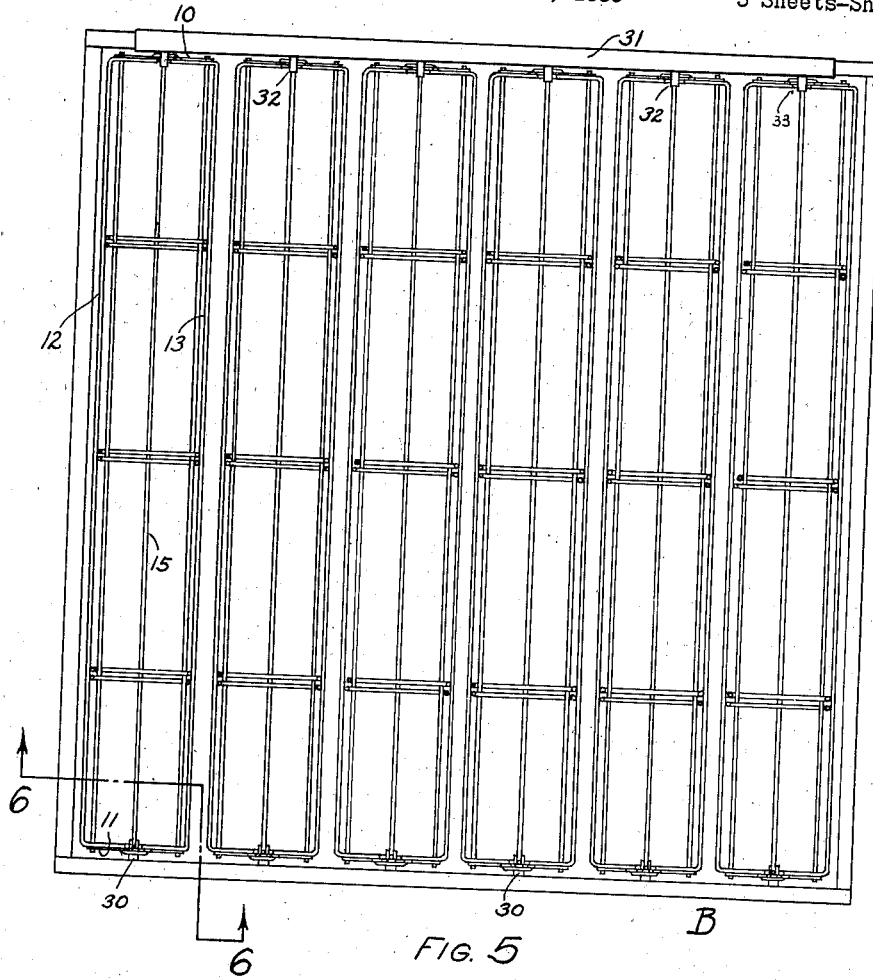
Fig. 5 is a top plan view of a tray equipped with my improved egg holding cages.

As thus illustrated, my egg cage in its entirety is designated by reference character A. The incubating tray having a full complement of egg cages is designated by reference character B.

Member A comprises preferably sheet metal end pieces 10 and 11. I provide two upper rods 12 and 13, their ends being bent inwardly and being secured to members 10 and 11 as at 14 by bonding or welding.

Center wire 15 is positioned as illustrated in Figures 3 and 4 having Z shaped end portions 16—16, the outer edge being secured to members 10 and 11 as at 17—17. From the bottom of members 10 and 11, I provide a centrally positioned cut-away portion as illustrated in Figures 3 and 4 which terminates into a vertically positioned slot 18, the slot extending to a point near or slightly above the center of gravity when the cage is filled with eggs.

I provide rods 20—20 having upturned ends 21—21 and outwardly extending portions which are journaled in openings 22 in the end members, thus members 20 are free to swing on the outturned ends as an axis. In Figures 1 and 3 I show members 20 in their working or normal position. In Figures 2 and 4, these members are shown as swung outwardly for purposes which will hereinafter appear.

I provide anchor rods 23 which are spaced in pairs preferably as illustrated in Figures 1 and 2 and secured to members 12, 13 and 15, the two anchors of a pair being alternately positioned and having alternately extended arms 24 and upturned ends 25, the upturned ends being positioned to thereby retain rods 20 against moving outwardly when the cage is filled with eggs.

In Figure 3 I illustrate by dotted lines an egg in its normal position in the cage. Thus it will be seen that the egg finds lodgement between rods 15 and 20 and will rest against rod 13 on one side of the cage and 12 on the other side of the cage. Thus it will be seen as illustrated in the figures that rods 12, 13 and 15 are held in spaced relation.

Members 23 are adapted to form spaces between which a suitable number of eggs may be nested whereby when the cage is tipped out of level longitudinally, the eggs will not crowd toward the low end of the cage and otherwise slop around in the cage when the cage is moved.

I provide a tray B of any suitable size comprising side and end members as illustrated, the end members being provided with trunnions 30 which project inwardly a short distance and being adapted to support the cages from the top of slots 18. Thus each of the cages will be rotatably supported on the trunnions 30.

I provide an inverted U-shaped member 31 which is slidably mounted over the top of the rear frame bar of the tray and having inwardly turned projections 32. These projections are adapted to rest normally within slot 33 which is cut into the top of end members 10 and 11 thus when member 31 is moved to the right or left, the cages will be rocked on trunnions 30.

Means are provided for supporting the trays in the cabinet drawer-like and for rocking the cages by means of a shaft which extends to the exterior of the cabinet as shown and described in my Patent No. 1,796,872, March 17, 1931.

Figure 6:
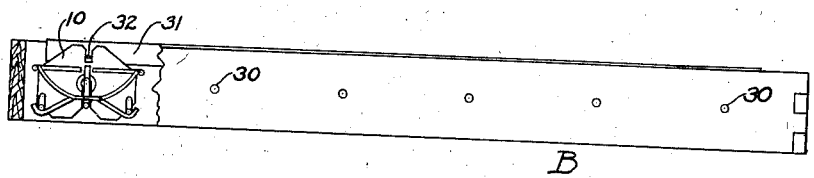
Fig. 6 is an end view of the device as illustrated in Figure 5 being sectioned on line 6—6 of Figure 5.

Figure 6 illustrates a cage in its vertical or central position. In practice, it is the custom to move the cages to an angled position either to the right or left for a purpose too well known to require further description.

In my device, the cages are preferably left in the trays permanently and one end of the tray is blocked somewhat higher than the other end and the eggs placed in the cages (see Figure 3) after which the tray is placed in the incubating cabinet. After say 19 days, or when the eggs begin to pip, it is desired that they be placed in hatching trays. To remove the eggs from the cages and place them in a hatching tray by the old method is somewhat difficult. I provide means whereby the eggs may be released downwardly in mass from the cages as follows:

Members 25 extend upwardly a short distance and will hold bars 20 from moving outwardly when the cage is filled with eggs. When it is desired to release the eggs into a hatching tray, all that is necessary is to use a hooked wire and lift members 20 over the ends of members 25 and to the position illustrated in Figure 4. Thus the eggs will be released. Before releasing, however, the hatching trays may be placed on a bench or a screen so the eggs will not be caused to drop more than a mere fraction of an inch.

In the present invention I provide means whereby the eggs may be moved directly into the hatching tray without handling in the following manner:

In Figures 7 and 8 I illustrate an incubating tray B as being positioned in the hatching tray C. In the preferred form of my invention, I provide hatching tray C having a loose screen bottom 35. This tray is provided with side and end members 36 and 37 having at their bottoms inturned flanges 38 upon which the screen 35 normally rests.

When it is desired to transfer eggs from an incubating tray to a hatching tray, two wood strips 39—39 are placed on the top of the table which, in Figure 8 is illustrated by reference numeral 40 and the hatching tray C is then placed over these strips so screen 35 is lifted to the position illustrated after which member B is placed on the screen (see Figure 8). Rods 20 are then lifted over members 25 and the eggs permitted to lie on member 35 after which tray B is removed leaving the eggs on the screen 35. Tray C is then lifted and the screen permitted to rest on flanges 38 after which the tray is placed in the cabinet drawer-like.

In Figure 9 I illustrate a fraction of a tray C as positioned in a cabinet, the fraction of the cabinet being designated by numeral 41. Thus it will be seen that it is a comparatively simple matter to move the eggs from the incubating tray to the hatching tray.

Clearly strips 39 may be high enough so member 35 is held practically at the top of the tray in which case tray C need not be made large enough to receive tray B as illustrated in Figure 8. If it is desired, tray C may be placed on the table or floor without the use of strips 39.

Clearly a single cabinet may be used in which to incubate and hatch the eggs. With my improved method and device either a single cabinet or separate cabinets may be provided for the trays. In either event, the trays are supported in the cabinet drawer-like as is the custom in incubators. The device shown illustrates my preferred manner of incubating, handling and hatching eggs.

Clearly many minor detail changes may be made without departing from the spirit and scope of my invention as recited in the appended claims.

Having thus shown and described my invention, I claim:

1. An egg cage of the class described, comprising spaced end members rigidly secured together by means of three rods, one of said rods being positioned adjacent the bottom of said end members and on the vertical center thereof, the other two rods being spaced a distance above and on opposite sides of the vertical plane of said single rod, two movable rods positioned on opposite sides of said single rod and being normally spaced therefrom whereby two rows of eggs may find free lodgement and be restrained from outward movement by said other two rods, said two movable rods being hingedly mounted on upwardly extending ends, and spaced transverse members each secured to and adapted to hold said single and other two rods in spaced relation and having extensions with upturned ends adapted to hold said movable rods in normal position but permit the rods to be manually disengaged and swung outwardly whereby the eggs may be released in mass downwardly.

2. A device as recited in claim 1 including; said end members having centrally positioned slots extending a distance upwardly from their bottoms, and said center rod having its ends offset to thereby clear said slots for the purpose specified.

3. A device of the class described, comprising an incubating and a hatching tray, the incubating tray having cages and means whereby the eggs in said cages may be released downwardly from the cages without handling, and means whereby the bottom in said hatching tray may be raised and said incubating tray placed thereover and the eggs released thereon.

GEORGE T. MARKEY.